US011262753B2

(12) United States Patent
Kanoh et al.

(10) Patent No.: US 11,262,753 B2
(45) Date of Patent: Mar. 1, 2022

(54) VEHICLE CONTROL SYSTEM

(71) Applicant: HONDA MOTOR CO., LTD., Tokyo (JP)

(72) Inventors: Tadahiko Kanoh, Wako (JP); Kanta Tsuji, Wako (JP); Tadashi Naruse, Wako (JP); Daichi Kato, Wako (JP); Takuya Tobe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 16/832,625

(22) Filed: Mar. 27, 2020

(65) Prior Publication Data
US 2020/0310418 A1 Oct. 1, 2020

(30) Foreign Application Priority Data

Mar. 29, 2019 (JP) .............................. JP2019067504

(51) Int. Cl.
G05D 1/00 (2006.01)
B60W 60/00 (2020.01)
G05D 1/02 (2020.01)
B60W 30/06 (2006.01)

(52) U.S. Cl.
CPC ........... *G05D 1/0061* (2013.01); *B60W 30/06* (2013.01); *B60W 60/0051* (2020.02); *B60W 60/0059* (2020.02); *G05D 1/0214* (2013.01); *B60W 2555/20* (2020.02); *B60W 2556/10* (2020.02); *G05D 2201/0213* (2013.01)

(58) Field of Classification Search
CPC ........ B60W 60/00253; B60W 2556/50; G05D 1/0276; G05D 1/0212; G06Q 50/30; G06Q 10/02; G08G 1/202
See application file for complete search history.

(56) References Cited

U.S. PATENT DOCUMENTS 9,766,085 B2 9/2017 Oooka et al.
2018/0201264 A1* 7/2018 Schoenly ............ B60W 30/165

FOREIGN PATENT DOCUMENTS

WO WO-2009130566 A1 * 10/2009 .......... E01F 15/0423

* cited by examiner

*Primary Examiner* — Rodney A Butler
(74) *Attorney, Agent, or Firm* — Armstrong Teasdale LLP

(57) ABSTRACT

In a vehicle control system, a control unit of the vehicle control system executes a stop process by which the vehicle is parked in a prescribed stop area when it is detected that the control unit or the driver has become incapable of properly maintaining a traveling state of the vehicle. In the stop process, the control unit determines a plurality of available stop areas according to the vehicle surroundings and map information, and computes, for each available stop area, a cumulative travel risk obtained by accumulating a travel risk involved in traveling from a position of the vehicle when the stop process is initiated to each available stop area and a stop risk in stopping in each available stop area, the control unit determining a final stop area by comparing the cumulative travel risk with the stop risk in each available stop area sequentially from the nearest one.

18 Claims, 6 Drawing Sheets

VEHICLE CONTROL SYSTEM

TECHNICAL FIELD

The present invention relates to a vehicle control system configured for autonomous driving.

BACKGROUND ART

It is known in the field of autonomous driving, in case of an emergency where the vehicle operator is incapacitated or has otherwise become unable to properly drive the vehicle, to autonomously maneuver the vehicle to a place where the traffic is least likely to be disrupted, and such a manoeuver is known as a minimal risk maneuver (MRM). See U.S. Pat. No. 9,766,085B2, for instance. According to this prior art, upon occurrence of an emergency situation where the system is required to take over the responsibility of driving the vehicle, and the vehicle happens to be located in a place from which the vehicle is required to evacuate, the system selects a plurality of target positions to which the vehicle may evacuate. The system then computes the risk of stopping at each position, and the risk of passing each position, and decides the target position to which the vehicle should evacuate. Once the target position is decided, the vehicle travels to the target position and comes to a stop at the target position.

According to this prior art, the target position is decided as soon as the need to evacuate the current position is determined. However, depending on the positions of the surrounding other vehicles, and the condition of the target position, the target position may have ceased to be suitable for the vehicle in the MRM situation to evacuate to by the time the vehicle reaches the target position.

SUMMARY OF THE INVENTION

In view of such a problem of the prior art, a primary object of the present invention is to provide a vehicle control system that can decide a target position for a vehicle in an emergency situation to proceed to in an optimum fashion.

To achieve such an object, the present invention provides a vehicle control system, comprising: a control unit (15) for steering, accelerating, and decelerating a vehicle; an occupant monitoring device (11) configured to monitor a driver of the vehicle; an external environment recognition device (6) configured to acquire information on an environment surrounding the vehicle; and a map device (9) retaining map information; wherein the control unit is configured to execute a stop process by which the vehicle is parked in a prescribed stop area when it is detected that the control unit or the driver has become incapable of properly maintaining a traveling state of the vehicle, and wherein, in the stop process, the control unit determines a plurality of available stop areas according to the information on the environment surrounding the vehicle and the map information, and computes, for each available stop area, a cumulative travel risk obtained by accumulating a travel risk involved in traveling from a position of the vehicle when the stop process is initiated to each available stop area and a stop risk in stopping in each available stop area, the control unit determining a final stop area by comparing the cumulative travel risk with the stop risk in each available stop area sequentially from the nearest one.

If the vehicle can be safely brought to a stop in a certain stop area can be determined by taking into account the cumulative travel risk in traveling to or through the stop area and the risk associated with coming to a stop at the stop area. When the initially selected stop area is found to be unsuitable, the vehicle automatically travels to another stop area. The same process may be repeated in the next potential stop area. As a result, the vehicle can be brought to a stop more safely and reliably.

Preferably, the control unit determines the available stop area at which the cumulative travel risk exceeds the stop risk as the final stop area, or alternatively, the control unit determines the available stop area immediately preceding the one at which the cumulative travel risk exceeds the stop risk as the final stop area.

Thereby, the vehicle can be brought to a stop in the stop area with a minimal risk.

Preferably, when a preceding vehicle is detected by the external environment recognition device, the control unit causes the vehicle to follow the preceding vehicle in each interval between adjoining available stop areas.

Thereby, the vehicle is enabled to travel to a next stop area with a minimal risk.

Preferably, the cumulative travel risk increases monotonically with a travel distance or a travel time.

Since the cumulative travel risk increases as the travel distance or travel time increases, the vehicle is prevented from continuing to travel indefinitely.

Preferably, the external environment recognition device is configured to capture an image of road signs, and the control unit increases the cumulative travel risk as the image of road signs grows darker.

When the brightness of the image captured by the external environment recognition device is equal to or less than a predetermined value, the possibility that road markings cannot be detected increases, and the cumulative travel risk may be increased accordingly. Thus, the higher the possibility that the road marking cannot be detected, the more the vehicle is prevented from continuing to travel. Therefore, if there is a high possibility that the road signs cannot be detected, the vehicle can be brought to a stop more quickly.

Preferably, the control unit increases the cumulative travel risk for each unit travel distance more at night than in daytime.

Thus, the cumulative travel risk is increased at night which is likely to involve a higher risk is traveling so that the vehicle can be brought to a stop more safely.

Preferably, the control unit increases the cumulative travel risk for each unit travel distance more on a rainy day than on a fine day.

Thus, the cumulative travel risk is increased on a rainy day than on a fine day in view of a higher risk in traveling on a rainy day so that the vehicle can be brought to a stop more safely.

Preferably, the occupant monitoring device is configured to detect an occupant other than a driver, and the control unit increases the cumulative travel risk for each unit travel distance more when the occupant other than the driver is detected than when the occupant other than the driver is not detected.

By thus bringing the vehicle to a stop more quickly when the occupant other than the driver is detected, the occupant is enabled to take over the driving more quickly.

Preferably, the external environment recognition device is configured to detect a following vehicle, and the control unit increases the cumulative travel risk for each unit travel distance more when the following vehicle is detected as the own vehicle is about to come to a stop in the next available stop area than when the following vehicle is not detected.

By thus computing the cumulative travel risk to be larger than when the following vehicle is detected than when the following vehicle is not detected, the vehicle can be brought to a stop more safely by reducing the possibility of a rear end collision by the following vehicle.

Preferably, the external environment recognition device is configured to detect an inter-vehicle distance between the own vehicle and a following vehicle, and the control unit increases the cumulative travel risk for each unit travel distance more when the inter-vehicle distance between the following vehicle and the own vehicle is equal to or lower than a prescribed value than when the inter-vehicle distance is greater than the prescribed value.

By taking into account the inter-vehicle distance between the own vehicle and the following vehicle, the risk of a rear end collision by the following vehicle can be more accurately evaluated.

Preferably, the control unit increases the cumulative travel risk for each unit travel distance more when the vehicle is traveling in a fast lane than when the vehicle is traveling in a slow lane.

When the vehicle is traveling in a fast lane, lane changes will be required for the vehicle to reach the stop area. Thereby, by taking into account if the vehicle is in a fast lane or not at the start of the stop process, the vehicle can be brought to a stop more safely.

Preferably, the control unit increases the cumulative travel risk in a part of a road where lanes are restricted.

A restriction in lanes means a higher risk for the vehicle due to merging of vehicles from the blocked or otherwise restricted lane. Thereby, by taking into account of the presence of a restriction in lanes, the vehicle can be brought to a stop more safely.

Preferably, the control unit determines the stop risk at each available stop area from the map information.

Thereby, the stop risk at each available stop area can be easily evaluated.

Preferably, the control unit increases the cumulative travel risk in a narrow part of a road.

A narrow part of a road tends to increase the risk in traveling for the vehicle. Therefore, by taking into account of the presence of a narrow part of a road, the vehicle can be brought to a stop more safely.

Preferably, the control unit increases the cumulative travel risk in a part of the route where past data indicates a high frequency of lane changes.

If lane changes occur at a high frequency in a certain part of the route, it means that this part of the route causes a high risk for the vehicle. Therefore, by taking into account of the frequency of lane changes in selected parts of the route, the vehicle can be brought to a stop more safely.

The present invention thus provides a vehicle control system that can decide a target position for a vehicle in an emergency situation to proceed to in an optimum fashion.

BRIEF DESCRIPTION OF THE DRAWING(S)

DESCRIPTION OF THE PREFERRED EMBODIMENT(S)

A vehicle control system according to a preferred embodiment of the present invention is described in the following with reference to the appended drawings. The following disclosure is based on left-hand traffic. In the case of right-hand traffic, the left and the right in the disclosure will be reversed.

First Embodiment

Figure 1:
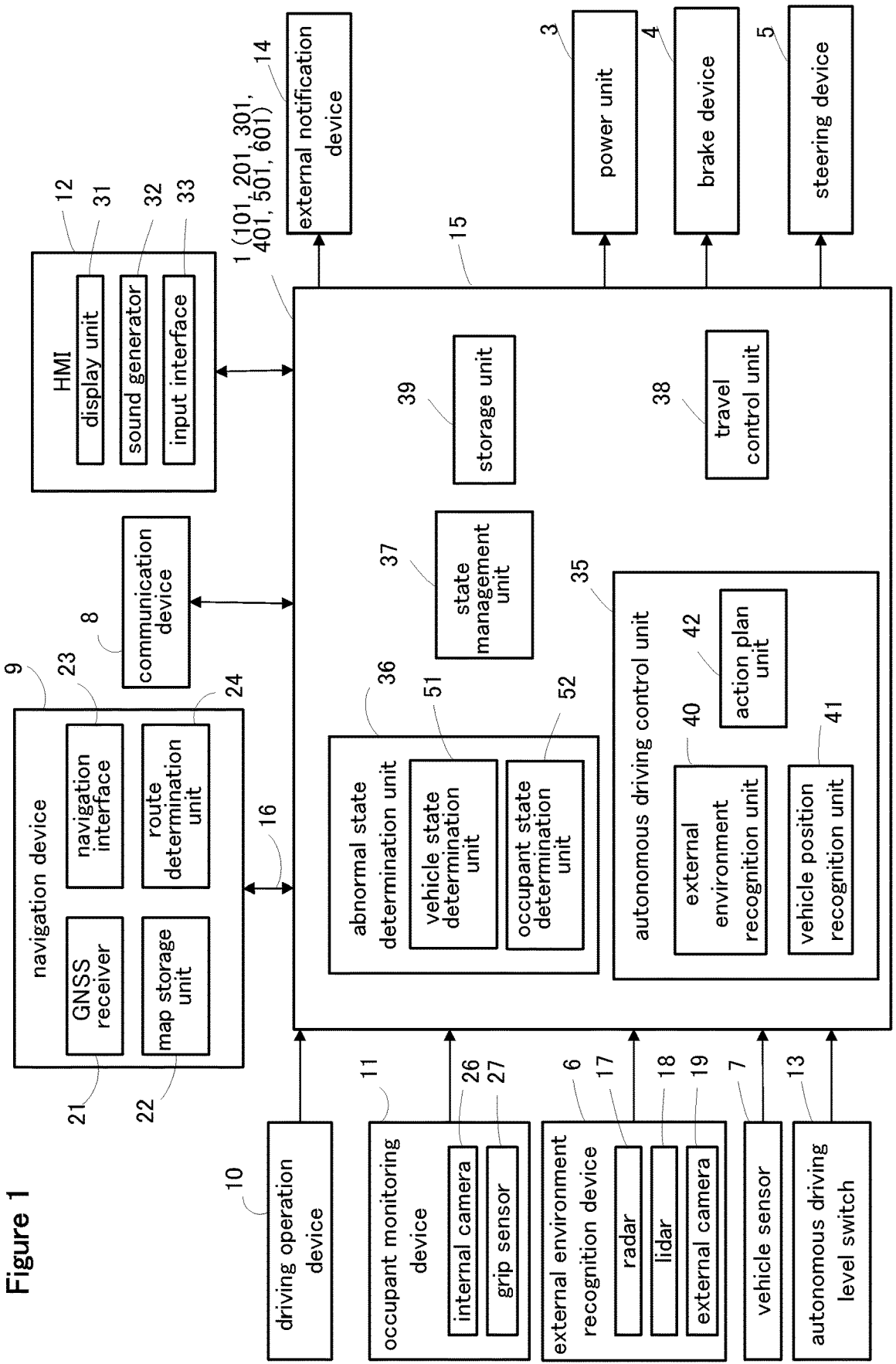
FIG. 1 is a functional block diagram of a vehicle on which a vehicle control system according to the present invention is mounted.

As shown in FIG. 1, the vehicle control system 1 according to the present invention is a part of a vehicle system 2 mounted on a vehicle. The vehicle system 2 includes a power unit 3, a brake device 4, a steering device 5, an external environment recognition device 6, a vehicle sensor 7, a communication device 8, a navigation device 9 (map device), a driving operation device 10, an occupant monitoring device 11, an HMI 12 (Human Machine Interface), an autonomous driving level switch 13, an external notification device 14, and a control unit 15. These components of the vehicle system 2 are connected to one another so that signals can be transmitted between them via a communication means such as CAN 16 (Controller Area Network).

The power unit 3 is a device for applying a driving force to the vehicle, and may include a power source and a transmission unit. The power source may consist of an internal combustion engine such as a gasoline engine and a diesel engine, an electric motor or a combination of these. The brake device 4 is a device that applies a braking force to the vehicle, and may include a brake caliper that presses a brake pad against a brake rotor, and an electrically actuated hydraulic cylinder that supplies hydraulic pressure to the brake caliper. The brake device 4 may also include a parking brake device. The steering device 5 is a device for changing a steering angle of the wheels, and may include a rack-and-pinion mechanism that steers the front wheels, and an electric motor that drives the rack-and-pinion mechanism. The power unit 3, the brake device 4, and the steering device 5 are controlled by the control unit 15.

The external environment recognition device 6 is a device that detects objects located outside of the vehicle. The external environment recognition device 6 may include a sensor that captures electromagnetic waves or light from around the vehicle to detect objects outside of the vehicle, and may consist of a radar 17, a lidar 18, an external camera 19, or a combination of these. The external environment recognition device 6 may also be configured to detect objects outside of the vehicle by receiving a signal from a source outside of the vehicle. The detection result of the external environment recognition device 6 is forwarded to the control unit 15.

The radar 17 emits radio waves such as millimeter waves to the surrounding area of the vehicle, and detects the position (distance and direction) of an object by capturing the reflected wave. Preferably, the radar 17 includes a front radar that radiates radio waves toward the front of the vehicle, a rear radar that radiates radio waves toward the rear of the vehicle, and a pair of side radars that radiates radio waves in the lateral directions.

The lidar 18 emits light such as an infrared ray to the surrounding part of the vehicle, and detects the position (distance and direction) of an object by capturing the reflected light. At least one lidar 18 is provided at a suitable position of the vehicle.

The external camera 19 can capture the image of the surrounding objects such as vehicles, pedestrians, guardrails, curbs, walls, median strips, road shapes, road signs, road markings painted on the road, and the like. The external camera 19 may consist of a digital camera using a solid-state imaging device such as a CCD and a CMOS. At least one external camera 19 is provided at a suitable position of the vehicle. The external camera 19 preferably includes a front camera that images the front of the vehicle, a rear camera that images the rear of the vehicle and a pair of side cameras that image the lateral views from the vehicle. The external camera 19 may consist of a stereo camera that can capture a three-dimensional image of the surrounding objects.

The vehicle sensor 7 may include a vehicle speed sensor that detects the traveling speed of the vehicle, an acceleration sensor that detects the acceleration of the vehicle, a yaw rate sensor that detects an angular velocity of the vehicle around a vertical axis, a direction sensor that detects the traveling direction of the vehicle, and the like. The yaw rate sensor may consist of a gyro sensor.

The communication device 8 allows communication between the control unit 15 which is connected to the navigation device 9 and other vehicles around the own vehicle as well as servers located outside the vehicle. The control unit 15 can perform wireless communication with the surrounding vehicles via the communication device 8. For instance, the control unit 15 can communicate with a server that provides traffic regulation information via the communication device 8, and with an emergency call center that accepts an emergency call from the vehicle also via the communication device 8. Further, the control unit 15 can communicate with a portable terminal carried by a person such as a pedestrian present outside the vehicle via the communication device 8.

The navigation device 9 is able to identify the current position of the vehicle, and performs route guidance to a destination and the like, and may include a GNSS receiver 21, a map storage unit 22, a navigation interface 23, and a route determination unit 24. The GNSS receiver 21 identifies the position (latitude and longitude) of the vehicle according to a signal received from artificial satellites (positioning satellites). The map storage unit 22 may consist of a per se known storage device such as a flash memory and a hard disk, and stores or retains map information. The navigation interface 23 receives an input of a destination or the like from the user, and provides various information to the user by visual display and/or speech. The navigation interface 23 may include a touch panel display, a speaker, and the like. In another embodiment, the GNSS receiver 21 is configured as a part of the communication device 8. The map storage unit 22 may be configured as a part of the control unit 15 or may be configured as a part of an external server that can communicate with the control unit 15 via the communication device 8.

The map information may include a wide range of road information which may include, not exclusively, road types such as expressways, toll roads, national roads, and prefectural roads, the number of lanes of the road, road markings such as the center position of each lane (three-dimensional coordinates including longitude, latitude, and height), road division lines and lane lines, the presence or absence of sidewalks, curbs, fences, etc., the locations of intersections, the locations of merging and branching points of lanes, the areas of emergency parking zones, the width of each lane, and traffic signs provided along the roads. The map information may also include traffic regulation information, address information (address/postal code), facility information, telephone number information, and the like.

The route determination unit 24 determines a route to the destination based on the position of the vehicle specified by the GNSS receiver 21, the destination input from the navigation interface 23, and the map information. When determining the route, in addition to the route, the route determination unit 24 determines the target lane which the vehicle will travel in by referring to the merging and branching points of the lanes in the map information.

The driving operation device 10 receives an input operation performed by the driver to control the vehicle. The driving operation device 10 may include a steering wheel, an accelerator pedal, and a brake pedal. Further, the driving operation device 10 may include a shift lever, a parking brake lever, and the like. Each element of the driving operation device 10 is provided with a sensor for detecting an operation amount of the corresponding operation. The driving operation device 10 outputs a signal indicating the operation amount to the control unit 15.

The occupant monitoring device 11 monitors the state of the occupant in the passenger compartment. The occupant monitoring device 11 includes, for example, an internal camera 26 that images an occupant sitting on a seat in the vehicle cabin, and a grip sensor 27 provided on the steering wheel. The internal camera 26 is a digital camera using a solid-state imaging device such as a CCD and a CMOS. The grip sensor 27 is a sensor that detects if the driver is gripping the steering wheel, and outputs the presence or absence of the grip as a detection signal. The grip sensor 27 may be formed of a capacitance sensor or a piezoelectric device provided on the steering wheel. The occupant monitoring device 11 may include a heart rate sensor provided on the steering wheel or the seat, or a seating sensor provided on the seat. In addition, the occupant monitoring device 11 may be a wearable device that is worn by the occupant, and can detect the vital information of the driver including at least one of the heart rate and the blood pressure of the driver. In this conjunction, the occupant monitoring device 11 may be configured to be able to communicate with the control unit 15 via a per se known wireless communication means. The occupant monitoring device 11 outputs the captured image and the detection signal to the control unit 15.

The external notification device 14 is a device for notifying to people outside of the vehicle by sound and/or light, and may include a warning light and a horn. A headlight (front light), a taillight, a brake lamp, a hazard lamp, and a vehicle interior light may function as a warning light.

The HMI 12 notifies the occupant of various kinds of information by visual display and speech, and receives an input operation by the occupant. The HMI 12 may include at least one of a display device 31 such as a touch panel and an indicator light including an LCD or an organic EL, a sound generator 32 such as a buzzer and a speaker, and an input interface 33 such as a GUI switch on the touch panel and a mechanical switch. The navigation interface 23 may be configured to function as the HMI 12.

The autonomous driving level switch 13 is a switch that activates autonomous driving as an instruction from the driver. The autonomous driving level switch 13 may be a mechanical switch or a GUI switch displayed on the touch panel, and is positioned in a suitable part of the cabin. The autonomous driving level switch 13 may be formed by the input interface 33 of the HMI 12 or may be formed by the navigation interface 23.

The control unit 15 may consist of an electronic control unit (ECU) including a CPU, a ROM, a RAM, and the like. The control unit 15 executes various types of vehicle control by executing arithmetic processes according to a computer program executed by the CPU. The control unit 15 may be configured as a single piece of hardware, or may be configured as a unit including a plurality of pieces of hardware. In addition, at least a part of each functional unit of the control unit 15 may be realized by hardware such as an LSI, an ASIC, and an FPGA, or may be realized by a combination of software and hardware.

The control unit 15 is configured to execute autonomous driving control of at least level 0 to level 3 by combining various types of vehicle control. The level is based on the definition of SAE J3016, and is determined in relation to the degree of machine intervention in the driving operation of the driver and in the monitoring of the surrounding environment of the vehicle.

In autonomous driving of level 0, the control unit 15 does not control the vehicle, and the driver performs all of the driving operations. Thus, autonomous driving of level 0 means a manual driving.

In autonomous driving of level 1, the control unit 15 executes a certain part of the driving operation, and the driver performs the remaining part of the driving operation. For example, autonomous driving level 1 includes constant speed traveling, inter-vehicle distance control (ACC; Adaptive Cruise Control) and lane keeping assist control (LKAS; Lane Keeping Assistance System). The level 1 autonomous driving is executed when various devices (for example, the external environment recognition device 6 and the vehicle sensor 7) required for executing the level 1 autonomous driving are all properly functioning.

In autonomous driving of level 2, the control unit 15 performs the entire driving operation. The level 2 autonomous driving is performed only when the driver monitors the surrounding environment of the vehicle, the vehicle is within a designated area, and the various devices required for performing the level 2 autonomous driving are all functioning properly.

In level 3 autonomous driving, the control unit 15 performs the entire driving operation. The level 3 autonomous driving requires the driver to monitor or be aware of the surrounding environment when required, and is executed only when the vehicle is within a designated area, and the various devices required for performing the level 3 autonomous driving are all functioning properly. The conditions under which the level 3 autonomous driving is executed may include that the vehicle is traveling on a congested road. Whether the vehicle is traveling on a congested road or not may be determined based on traffic regulation information provided from a server outside of the vehicle, or, alternatively, that the vehicle speed detected by the vehicle speed sensor is determined to be lower than a predetermined slowdown determination value (for example, 30 km/h) over a predetermined time period.

Thus, in the autonomous driving of levels 1 to 3, the control unit 15 executes at least one of the steering, the acceleration, the deceleration, and the monitoring of the surrounding environment. When in the autonomous driving mode, the control unit 15 executes the autonomous driving of level 1 to level 3. Hereinafter, the steering, acceleration, and deceleration operations are collectively referred to as driving operation, and the driving and the monitoring of the surrounding environment may be collectively referred to as driving.

In the present embodiment, when the control unit 15 has received an instruction to execute autonomous driving via the autonomous driving level switch 13, the control unit 15 selects the autonomous driving level that is suitable for the environment of the vehicle according to the detection result of the external environment recognition device 6 and the position of the vehicle acquired by the navigation device 9, and changes the autonomous driving level as required. However, the control unit 15 may also change the autonomous driving level according the input to the autonomous driving level switch 13.

As shown in FIG. 1, the control unit 15 includes an autonomous driving control unit 35, an abnormal state determination unit 36, a state management unit 37, a travel control unit 38, and a storage unit 39.

The autonomous driving control unit 35 includes an external environment recognition unit 40, a vehicle position recognition unit 41, and an action plan unit 42. The external environment recognition unit 40 recognizes an obstacle located around the vehicle, the shape of the road, the presence or absence of a sidewalk, and road signs based on the detection result of the external environment recognition device 6. The obstacles include, not exclusively, guardrails, telephone poles, surrounding vehicles, and pedestrians. The external environment recognition unit 40 can acquire the state of the surrounding vehicles, such as the position, speed, and acceleration of each surrounding vehicle from the detection result of the external environment recognition device 6. The position of each surrounding vehicle may be recognized as a representative point such as a center of gravity position or a corner positions of the surrounding vehicle, or an area represented by the contour of the surrounding vehicle.

The vehicle position recognition unit 41 recognizes a traveling lane, which is a lane in which the vehicle is traveling, and a relative position and an angle of the vehicle with respect to the traveling lane. The vehicle position recognition unit 41 may recognize the traveling lane based on the map information stored in the map storage unit 22 and the position of the vehicle acquired by the GNSS receiver 21. In addition, the lane markings drawn on the road surface around the vehicle may be extracted from the map information, and the relative position and angle of the vehicle with respect to the traveling lane may be recognized by comparing the extracted lane markings with the lane markings captured by the external camera 19.

The action plan unit 42 sequentially creates an action plan for driving the vehicle along the route. More specifically, the action plan unit 42 first determines a set of events for traveling on the target lane determined by the route determination unit 24 without the vehicle coming into contact with an obstacle. The events may include a constant speed traveling event in which the vehicle travels in the same lane at a constant speed, a preceding vehicle following event in which the vehicle follows a preceding vehicle at a certain speed which is equal to or lower than a speed selected by the driver or a speed which is determined by the prevailing environment, a lane changing event in which the vehicle change lanes, a passing event in which the vehicle passes a preceding vehicle, a merging event in which the vehicle merge into the traffic from another road at a junction of the road, a diverging event in which the vehicle travels into a selected road at a junction of the road, an autonomous driving end event in which autonomous driving is ended, and the driver takes over the driving operation, and a stop event in which the vehicle is brought to a stop when a certain condition is met, the condition including a case where the control unit 15 or the driver has become incapable of continuing the driving operation.

The conditions under which the action plan unit 42 invokes the stop event include the case where an input to the internal camera 26, the grip sensor 27, or the autonomous driving level switch 13 in response to an intervention request (a hand-over request) to the driver is not detected during autonomous driving. The intervention request is a warning to the driver to take over a part of the driving, and to perform at least one of the driving operation and the monitoring of the environment corresponding to the part of the driving that is to be handed over. The condition under which the action plan unit 42 invokes the stop even include the case where the action plan unit 42 has detected that the driver has become incapable of performing the driving while the vehicle is traveling due to a physiological ailment according to the signal from a pulse sensor, the internal camera or the like.

During the execution of these events, the action plan unit 42 may invoke an avoidance event for avoiding an obstacle or the like based on the surrounding conditions of the vehicle (existence of nearby vehicles and pedestrians, lane narrowing due to road construction, etc.).

The action plan unit 42 generates a target trajectory for the vehicle to travel in the future corresponding to the selected event. The target trajectory is obtained by sequentially arranging trajectory points that the vehicle should trace at each time point. The action plan unit 42 may generate the target trajectory based on the target speed and the target acceleration set for each event. At this time, the information on the target speed and the target acceleration is determined for each interval between the trajectory points.

The travel control unit 38 controls the power unit 3, the brake device 4, and the steering device 5 so that the vehicle traces the target trajectory generated by the action plan unit 42 according to the schedule also generated by the action plan unit 42.

The storage unit 39 is formed by a ROM, a RAM, or the like, and stores information required for the processing by the autonomous driving control unit 35, the abnormal state determination unit 36, the state management unit 37, and the travel control unit 38.

The abnormal state determination unit 36 includes a vehicle state determination unit 51 and an occupant state determination unit 52. The vehicle state determination unit 51 analyzes signals from various devices (for example, the external environment recognition device 6 and the vehicle sensor 7) that affect the level of the autonomous driving that is being executed, and detects the occurrence of an abnormality in any of the devices and units that may prevent a proper execution of the autonomous driving of the level that is being executed.

The occupant state determination unit 52 determines if the driver is in an abnormal state or not according to a signal from the occupant monitoring device 11. The abnormal state includes the case where the driver is unable to properly steer the vehicle in autonomous driving of level 1 or lower that requires the driver to steer the vehicle. That the driver is unable to steer the vehicle in autonomous driving of level 1 or lower could mean that the driver is not holding the steering wheel, the driver is asleep, the driver is incapacitated or unconscious due to illness or injury, or the driver is under a cardiac arrest. The occupant state determination unit 52 determines that the driver is in an abnormal state when there is no input to the grip sensor 27 from the driver while in autonomous driving of level 1 or lower that requires the driver to steer the vehicle. Further, the occupant state determination unit 52 may determine the open/closed state of the driver's eyelids from the face image of the driver that is extracted from the output of the internal camera 26. The occupant state determination unit 52 may determine that the driver is asleep, under a strong drowsiness, unconscious or under a cardiac arrest so that the drive is unable to properly drive the vehicle, and the driver is in an abnormal condition when the driver's eyelids are closed for more than a predetermined time period, or when the number of times the eyelids are closed per unit time interval is equal to or greater than a predetermined threshold value. The occupant state determination unit 52 may further acquire the driver's posture from the captured image to determine that the driver's posture is not suitable for the driving operation or that the posture of the driver does not change for a predetermined time period. It may well mean that the driver is incapacitated due to illness or injury, and in an abnormal condition.

In the case of autonomous driving of level 2 or lower, the abnormal condition includes a situation where the driver is neglecting the duty to monitor the environment surrounding the vehicle. This situation may include either the case where the driver is not holding or gripping the steering wheel or the case where the driver's line of sight is not directed in the forward direction. The occupant state determination unit 52 may detect the abnormal condition where the driver is neglecting to monitor the environment surrounding the vehicle when the output signal of the grip sensor 27 indicates that the driver is not holding the steering wheel. The occupant state determination unit 52 may detect the abnormal condition according to the image captured by the internal camera 26. The occupant state determination unit 52 may use a per se known image analysis technique to extract the face region of the driver from the captured image, and then extracts the iris parts (hereinafter, iris) including the inner and outer corners of the eyes and pupils from the extracted face area. The occupant state determination unit 52 may detect the driver's line of sight according to the positions of the inner and outer corners of the eyes, the iris, the outline of the iris, and the like. It is determined that the driver is neglecting the duty to monitor the environment surrounding the vehicle when the driver's line of sight is not directed in the forward direction.

In addition, in the autonomous driving at a level where the drive is not required to monitor the surrounding environment or in the autonomous driving of level 3, an abnormal condition refers to a state in which the driver cannot promptly take over the driving when a driving takeover request is issued to the driver. The state where the driver cannot take over the driving includes the state where the system cannot be monitored, or, in other words, where the driver cannot monitor a screen display that may be showing an alarm display such as when the driver is asleep, and when the driver is not looking ahead. In the present embodiment, in the level 3 autonomous driving, the abnormal condition includes a case where the driver cannot perform the duty of monitoring the surrounding environment of the vehicle even though the driver is notified to monitor the surrounding environment of the vehicle. In the present embodiment, the occupant state determination unit 52 displays a predetermined screen on the display device 31 of the HMI 12, and instructs the driver to look at the display device 31. Thereafter, the occupant state determination unit 52 detects the driver's line of sight with the internal camera 26, and determines that the driver is unable to fulfill the duty of monitoring the surrounding environment of the vehicle if driver's line of sight is not facing the display device 31 of the HMI 12.

The occupant state determination unit 52 may detect if the driver is gripping the steering wheel according to the signal from the grip sensor 27, and if the driver is not gripping the steering wheel, it can be determined that the vehicle is in an abnormal state in which the duty of monitoring the surrounding environment the vehicle is being neglected. Further, the occupant state determination unit 52 determines if the driver is in an abnormal state according to the image captured by the internal camera 26. For example, the occupant state determination unit 52 extracts a driver's face region from the captured image by using a per se known image analysis means. The occupant state determination unit 52 may further extract iris parts (hereinafter, iris) of the driver including the inner and outer corners of the eyes and pupils from the extracted face area. The occupant state determination unit 52 obtains the driver's line of sight according to the extracted positions of the inner and outer corners of the eyes, the iris, the outline of the iris, and the like. It is determined that the driver is neglecting the duty to monitor the environment surrounding the vehicle when the driver's line of sight is not directed in the forward direction.

The state management unit 37 selects the level of the autonomous driving according to at least one of the own vehicle position, the operation of the autonomous driving level switch 13, and the determination result of the abnormal state determination unit 36. Further, the state management unit 37 controls the action plan unit 42 according to the selected autonomous driving level, thereby performing the autonomous driving according to the selected autonomous driving level. For example, when the state management unit 37 has selected the level 1 autonomous driving, and a constant speed traveling control is being executed, the event to be determined by the action plan unit 42 is limited only to the constant speed traveling event.

The state management unit 37 raises and lowers the autonomous driving level as required in addition to executing the autonomous driving according to the selected level.

More specifically, the state management unit 37 raises the level when the condition for executing the autonomous driving at the selected level is met, and an instruction to raise the level of the autonomous driving is input to the autonomous driving level switch 13.

When the condition for executing the autonomous driving of the current level ceases to be satisfied, or when an instruction to lower the level of the autonomous driving is input to the autonomous driving level switch 13, the state management unit 37 executes an intervention request process. In the intervention request process, the state management unit 37 first notifies the driver of a handover request. The notification to the driver may be made by displaying a message or image on the display device 31 or generating a speech or a warning sound from the sound generator 32. The notification to the driver may continue for a predetermined period of time after the intervention request process is started or may be continued until an input is detected by the occupant monitoring device 11.

The condition for executing the autonomous driving of the current level ceases to be satisfied when the vehicle has moved to an area where only the autonomous driving of a level lower than the current level is permitted, or when the abnormal state determination unit 36 has determined that an abnormal condition that prevents the continuation of the autonomous driving of the current level has occurred to the driver or the vehicle.

Following the notification to the driver, the state management unit 37 detects if the internal camera 26 or the grip sensor 27 has received an input from the driver indicating a takeover of the driving. The detection of the presence or absence of an input to take over the driving is determined in a way that depends on the level that is to be selected. When moving to level 2, the state management unit 37 extracts the driver's line of sight from the image acquired by the internal camera 26, and when the driver's line of sight is facing the front of the vehicle, it is determined that an input indicating the takeover of the driving by the driver is received. When moving to level 1 or level 0, the state management unit 37 determines that there is an input indicating an intent to take over the driving when the grip sensor 27 has detected the gripping of the steering wheel by the driver. Thus, the internal camera 26 and the grip sensor 27 function as an intervention detection device that detects an intervention of the driver to the driving. Further, the state management unit 37 may detect if there is an input indicating an intervention of the driver to the driving according to the input to the autonomous driving level switch 13.

The state management unit 37 lowers the autonomous driving level when an input indicating an intervention to the driving is detected within a predetermined period of time from the start of the intervention request process. At this time, the level of the autonomous driving after the lowering of the level may be level 0, or may be the highest level that can be executed.

The state management unit 37 causes the action plan unit 42 to generate a stop event when an input corresponding to the driver's intervention to the driving is not detected within a predetermined period of time after the execution of the intervention request process. The stop event is an event in which the vehicle is brought to a stop at a safe position (for example, an emergency parking zone, a roadside zone, a roadside shoulder, a parking area, etc.) while the vehicle control is degenerated. Here, a series of procedures executed in the stop event may be referred to as MRM (Minimum Risk Maneuver).

When the stop event is invoked, the control unit 15 shifts from the autonomous driving mode to the automatic stop mode, and the action plan unit 42 executes the stop process. Hereinafter, an outline of the stop process is described with reference to the flowchart of FIG. 2.

In the stop process, a notification process is first executed (ST1). In the notification process, the action plan unit 42 operates the external notification device 14 to notify the people outside of the vehicle. For example, the action plan unit 42 activates a horn included in the external notification device 14 to periodically generate a warning sound. The notification process continues until the stop process ends. After the notification process has ended, the action plan unit 42 may continue to activate the horn to generate a warning sound depending on the situation.

Then, a degeneration process is executed (ST2). The degeneration process is a process of restricting events that can be invoked by the action plan unit 42. The degeneration process may prohibit a lane change event to a passing lane, a passing event, a merging event, and the like. Further, in the degeneration process, the speed upper limit and the acceleration upper limit of the vehicle may be more limited in the respective events as compared with the case where the stop process is not performed.

Next, a stop area determination process is executed (ST3). The stop area determination process refers to the map information based on the current position of the own vehicle, and extracts a plurality of available stop areas (candidates for the stop area or potential stop areas) suitable for stopping, such as road shoulders and evacuation spaces in the traveling direction of the own vehicle. Then, one of the available stop areas is selected as the stop area by taking into account the size of the stop area, the distance to the stop area, and the like.

Next, a moving process is executed (ST4). In the moving process, a route for reaching the stop area is determined, various events along the route leading to the stop area are generated, and a target trajectory is determined. The travel control unit 38 controls the power unit 3, the brake device 4, and the steering device 5 based on the target trajectory determined by the action plan unit 42. The vehicle then travels along the route and reaches the stop area.

Next, a stop position determination process is executed (ST5). In the stop position determination process, the stop position is determined based on obstacles, road markings, and other objects located around the vehicle recognized by the external environment recognition unit 40. In the stop position determination process, it is possible that the stop position cannot be determined in the stop area due to the presence of surrounding vehicles and obstacles. When the stop position cannot be determined in the stop position determination process (No in ST6), the stop area determination process (ST3), the movement process (ST4), and the stop position determination process (ST5) are sequentially repeated.

If the stop position can be determined in the stop position determination process (Yes in ST6), a stop execution process is executed (ST7). In the stop execution process, the action plan unit 42 generates a target trajectory based on the current position of the vehicle and the targeted stop position. The travel control unit 38 controls the power unit 3, the brake device 4, and the steering device 5 based on the target trajectory determined by the action plan unit 42. The vehicle then moves toward the stop position and stops at the stop position.

After the stop execution process is executed, a stop maintaining process is executed (ST8). In the stop maintaining process, the travel control unit 38 drives the parking brake device according to a command from the action plan unit 42 to maintain the vehicle at the stop position. Thereafter, the action plan unit 42 may transmit an emergency call to the emergency call center by the communication device 8. When the stop maintaining process is completed, the stop process ends.

In the present embodiment, the vehicle control system 1 includes an external environment recognition device 6, a navigation device 9 (map device), an occupant monitoring device 11, and a control unit 15. The control unit 15 is configured to compute a cumulative travel risk which the traveling of the vehicle incurs as a numerical value. The cumulative travel risk is accumulated from the time point of initiating the stop process, and is evaluated at each available stop area.

Figure 3:
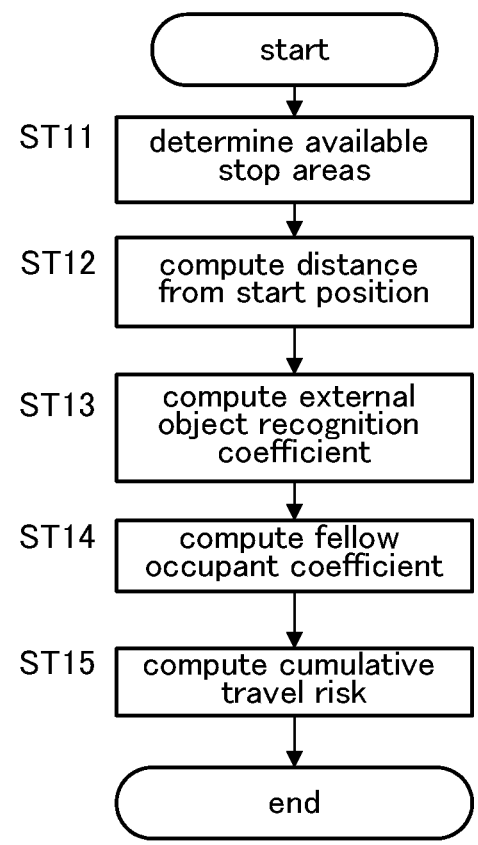
FIG. 3 is a flowchart of a stop area determination process.

The details of the stop area determination process are described in the following with reference to FIG. 3. As a part of the stop area determination process, the cumulative risk is computed. In the following discussion, it is assumed that the time duration of the stop process is sufficiently short, and there is no change in the weather or in the distinction between daytime and nighttime.

The action plan unit 42 determines a plurality of available stop areas in the first step ST11 of the stop area determination process. More specifically, the action plan unit 42 searches for available stop areas which are suitable for at least temporarily parking the vehicle, such as a road shoulder of a road on the route to a destination according to the map information. When the determination of available stop areas is completed, the action plan unit 42 executes step ST12.

In step ST12, the action plan unit 42 computes the distance on the route between the start position X and each stop area determined in step ST11 by referring to the map information. The computed distance corresponds to the travel distance of the vehicle S when the vehicle S travels from the start position to the corresponding available stop area along the route determined by the navigation device 9. In the present embodiment, the action plan unit 42 computes the distance on the route from the start position to each available stop area in kilometers (km). When the computation of the distances ends, the action plan unit 42 executes step ST13.

The action plan unit 42 computes an external object recognition coefficient in step ST13. The external object recognition coefficient is a numerical value indicating the difficulty of detecting an object in the environment where the vehicle is traveling. In the present embodiment, the external object recognition coefficient indicates the difficulty for the external environment recognition unit 40 to detect a road sign from the image captured by the external camera 19, and this typically depends on the brightness of the image captured by the external camera 19.

The brightness here indicates the brightness of the object, and is a numerical value that increases as the brightness increases. The external object recognition coefficient approaches 1 as the brightness increases, and increases as the brightness decreases. More specifically, the external object recognition coefficient is set to 1 when the vehicle is traveling in an environment where the outside of the vehicle is bright, and the road marking and the road signs can be reliably recognized by the external environment recognition unit 40. As the outside of the vehicle becomes darker and it becomes harder to recognize the road marking or the like, the external object recognition coefficient increases in value. For example, the external object recognition coefficient is set to 1 when the vehicle S is traveling in the daytime and the weather is fine, and the external object recognition coefficient is set to a value greater than 1 when the vehicle is traveling in the nighttime and the weather is poor due to rain, snow, hail, or fog.

In the present embodiment, in step ST13, the action plan unit 42 computes the external object recognition coefficient according to a time coefficient associated with time and a weather coefficient associated with weather. More specifically, first, the action plan unit 42 connects to an external time server (NTP server) via the communication device 8 and acquires the current time. Next, the action plan unit 42 determines if the acquired time corresponds to daytime (for example, between 7:00 am and 6:00 pm) or to any other time. In the case of daytime, the time coefficient is set to 1, and in other time, the time coefficient is set to a numerical value larger than 1 (for example, 1.2).

Then, the action plan unit 42 acquires the weather outside the vehicle. More specifically, the action plan unit 42 connects to an external server via the communication device 8, and acquires the weather at the current location of the vehicle S. When the external camera 19 is provided behind the windshield, the action plan unit 42 may analyze the image captured by the external camera 19 by using a per se known image analysis means based on, for example, deep learning, and determines the weather. When the weather is rain, snow, hail, or fog, the action plan unit 42 sets the weather coefficient to a numerical value larger than 1 (for example, 1.2), and otherwise sets the weather coefficient to 1 (the weather coefficient is left unchanged). Thereafter, the action plan unit 42 computes the product of the time coefficient and the weather coefficient, and sets the product as the external object recognition coefficient. After that, the action plan unit 42 executes step ST14.

In step ST14, the action plan unit 42 computes a fellow occupant coefficient. The fellow occupant coefficient is a numerical value of 1 or more, and is set so as to increase monotonically with the number of occupants onboard other than the driver, or the number of fellow occupants. In the present embodiment, the action plan unit 42 analyzes the image captured by the internal camera 25 by using a per se known image analysis unit based on, for example, deep learning, and computes the number of occupants. Next, the action plan unit 42 multiplies a predetermined positive numerical value (for example, 0.2) to the number of fellow occupants, and adds 1 thereto as a fellow occupant coefficient. When the computation of the fellow occupant coefficient is completed, the action plan unit 42 executes step ST15.

The action plan unit 42 computes a cumulative travel risk in step ST15. The cumulative travel risk is determined so as to increase monotonically with the travel distance (or travel time). Further, the cumulative travel risk is determined so as to monotonically increase with the external object recognition coefficient and the fellow occupant coefficient. In the present embodiment, as an example, the action plan unit 42 computes the cumulative travel risk as the product of the mileage, the external object recognition coefficient, and the fellow occupant coefficient.

For example, in the daytime and under a fine weather (the external object recognition coefficient is 1), when only the driver is on board (the fellow occupant coefficient is 1), the cumulative travel risk is computed to be equal to the travel distance. After finishing the computation of the cumulative travel risk, the action plan unit 42 ends the stop area determination process.

Next, a moving process is described in the following. In the moving process, the own vehicle travels from the start point of the stop process or one of the available stop areas to the next available stop area. The action plan unit 42 may generate or invoke a following event during the moving process when a preceding vehicle traveling in the same direction is detected. In the following event, the own vehicle follows the preceding vehicle at a prescribed inter-vehicle distance. When no suitable preceding vehicle is detected by the external camera 19, the action plan unit 42 generates a constant speed traveling event so that the own vehicle travels at a prescribed constant speed. The action plan unit 42 may be configured to generate a lane change event or the like as needed.

Figure 4:
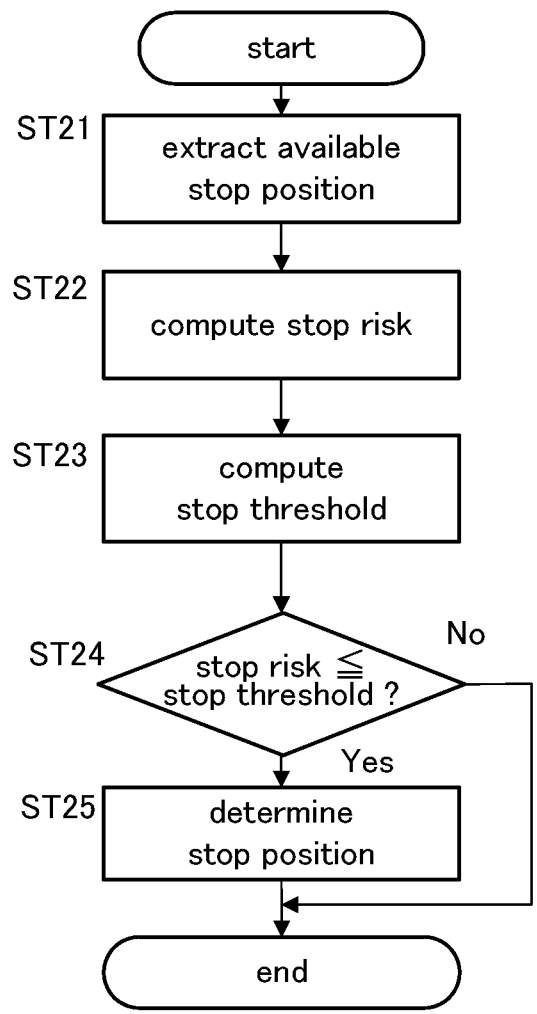
FIG. 4 is a flowchart of a stop position determination process.

Details of a stop position determination process which is executed in the stop area are described in the following with reference to FIG. 4.

In the first step ST21 of the stop position determination process, the action plan unit 42 extracts a position suitable for stopping in the stop area by using the image captured by the external camera 19, and sets the position as an available stop position.

Next, the action plan unit 42 executes step ST22. In step ST22, the action plan unit 42 computes a stop risk. The stop risk is a numerical value of a possibility that a problem or a risky situation is likely to occur when stopping the vehicle S at the available stop position. Examples of such a problem may include a case where the available stop position has an obstacle, a case where some difficulty is encountered in entering the available stop position, and a case where there is a risk of collision with a nearby vehicle while moving to the available stop position. The action plan unit 42 determines the stop risk such that the stop risk increases as the possibility of occurrence of a problem when stopping the vehicle S at the available stop position and/or a severity of the problem that may be encountered increases. In the present embodiment, the stop risk is set to 0 when the vehicle S can be brought to a stop at the available stop position without any substantial problem, and is set to 1 when the vehicle S cannot be brought to a stop at the available stop position.

In the present embodiment, the action plan unit 42 uses a per se known image analysis unit to analyze an image captured by the external camera 19 to obtain a vehicle or the like located around the available stop position, and computes a stop risk according to the captured image. For example, upon recognizing that there is already a parked vehicle at the available stop position, the action plan unit 42 determines that the vehicle S cannot be brought to a stop at this particular position, and sets the stop risk to 1. For example, when the available stop position is set to a space having a sufficient area on the left side of a straight and flat road, and the vehicle S can be stopped without any problem and with a minimal risk, the action plan unit 42 sets the stop risk to zero.

The action plan unit 42 may acquire the road information of the road on which the available stop position is selected from the map information, and compute the stop risk of the available stop position according to the shape of the road. For example, when the available stop position is located on a side of a curved road, the stop risk may be set closer to 1 as the curvature increases. When the available stop position is located near a cliff, the stop risk may be set to approach 1. In this way, by referring to the map information, it is possible to accurately and easily evaluate the risk of stopping according to the shape and terrain of the road.

The action plan unit 42 acquires the inter-vehicle distance relative to the following vehicle using at least one of the radar 17 and the lidar 18. When the acquired inter-vehicle distance is equal to or less than an appropriate inter-vehicle distance (80 m in the present embodiment), the action plan unit 42 computes the stop risk higher than when the inter-vehicle distance is larger than the appropriate inter-vehicle distance. This allows the risk of a rear end collision with the following vehicle when stopping the vehicle to be reduced. The action plan unit 42 may compute the stop risk to be lower when a following vehicle is not detected than when a following vehicle is detected, and the distance is equal to or less than the appropriate inter-vehicle distance.

Next, the action plan unit 42 executes step ST23. In step ST23, the action plan unit 42 computes a stop threshold. The stop threshold is a threshold value which can be computed from the cumulative travel risk, and is compared with the stop risk of each available stop position to determine if the vehicle should be brought to a stop at the particular stop position. In the present embodiment, the stop threshold is determined so as to increase monotonically with the cumulative travel risk. For example, the action plan unit 42 may compute a value obtained by multiplying 0.1 to the cumulative travel risk as the stop threshold.

Next, the action plan unit 42 executes step ST24. In step ST24, the action plan unit 42 determines whether the stop risk is equal to or less than the stop threshold. The action plan unit 42 executes step ST25 when the stop risk is equal to or less than the stop threshold, and ends the stop position determination process without determining the stop position when the stop risk is larger than the stop threshold. Thus, the control unit 15 determines the available stop area at which the cumulative travel risk exceeds the stop risk as the final stop area.

Alternatively, the control unit may determine the available stop area immediately preceding the one at which the cumulative travel risk exceeds the stop risk as the final stop area.

The cumulative travel risk generally increases with the traveling distance. The final stop area is selected as the last stop area where the cumulative travel risk does not exceed the stop risk. If you traveled further to the stop area following the last stop area, the cumulative travel risk would have exceeded the stop risk.

In step ST25, the action plan unit 42 determines an available stop position as the final stop position. Once the determination of the stop position is completed, the action plan unit 42 ends the stop position determination process.

Next, the mode of operation and effect of the vehicle control system thus described above are discussed in the following with reference to FIG. 5. In the example of the movement of the vehicle S when the stop process is executed shown in FIG. 5, it is assumed that only the driver is onboard the vehicle, and it is in the daytime and in fine weather.

Figure 5:
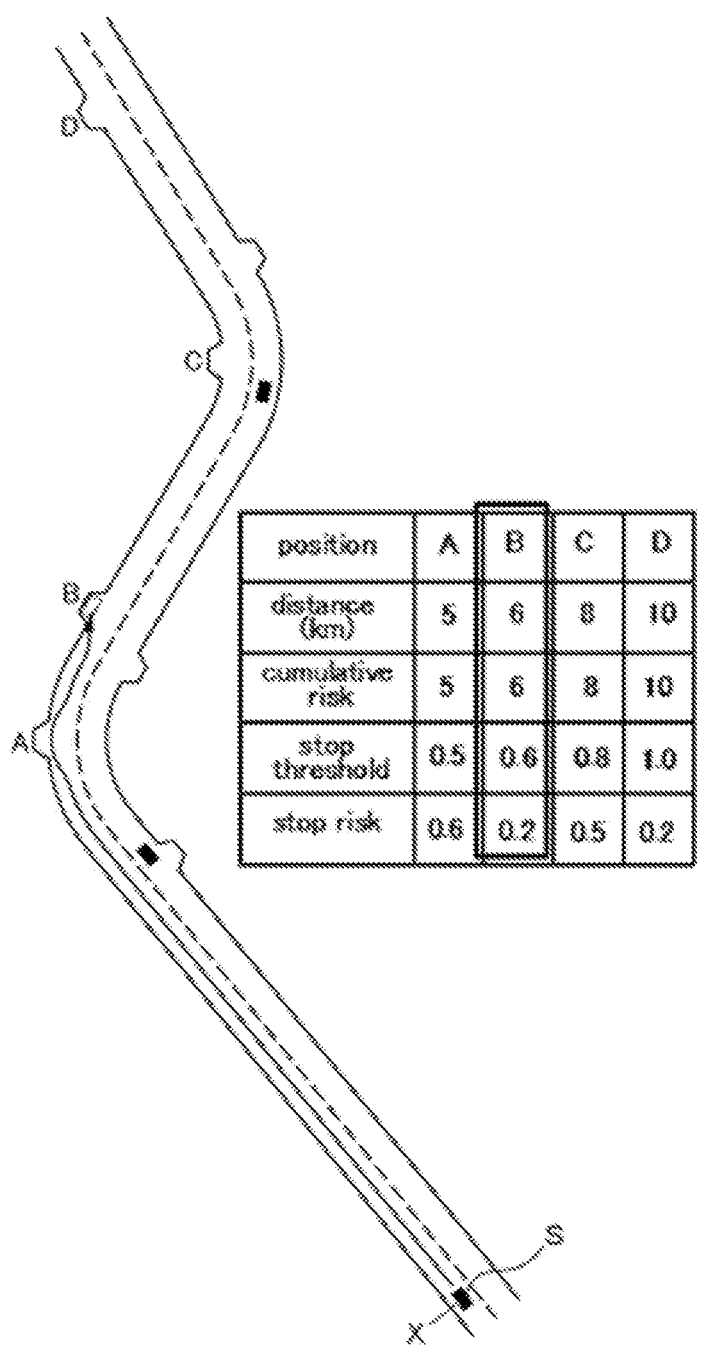
FIG. 5 is a diagram illustrating the movement of a vehicle in the stop process and the risks involved in traveling and stopping in available areas during the daytime on a clear day.

In the example shown in FIG. 5, the vehicle S is at the start position X (where the stop process is initiated), and there are four available stop areas A, B, C, and D along the route which are potentially suitable for bringing the vehicle to a stop. The table in FIG. 5 shows the distances on the route from the start position X to the available stop areas A, B, C, and D. The distance from the start position X to the available stop area A is the shortest so that the available stop area A is closest to the vehicle at the start position X. The available stop areas B, C and D are located at progressively greater distances from the start position X along the route in that order. The available stop area D is 10 km away from the start position X along the route. An available stop position can be designated for each of the available stop areas A, B, C, and D. The available stop areas A, B, C, and D are connected by a road having a substantially constant width, and there is no narrowing of the road between the start position X and the last available stop area D. The available stop area A and the available stop area C are both located in parts of the road where the curvature is large, and the stop risk is higher in the available stop area A and the available stop area C than in the available stop area B and the available stop area D. Further, it is assumed that the inter-vehicle distance with the following vehicle is sufficiently large until the vehicle S comes to a stop.

When the stop process is initiated, the action plan unit 42 executes the stop area determination process at the start position X (ST3). In the stop area determination process, the action plan unit 42 selects the available stop area A closest to the vehicle S from the available stop areas A, B, C, and D as the currently selected stop area (ST11). Thereafter, the action plan unit 42 computes the distance (5 km) on the route from the start position X to the stop area A (ST12). Thereafter, since the vehicle S is traveling in the daytime and under fine weather, the action plan unit 42 computes the external object recognition coefficient as 1 (ST13). Thereafter, since only the driver is on the vehicle S, the action plan unit 42 computes the fellow occupant coefficient as 1 (ST14). Next, as shown in the table of FIG. 5, the action plan unit 42 computes the cumulative travel risk for the stop area A as 5 (ST15).

After that, the control unit 15 causes the vehicle S to automatically travel and move from the start position X to the stop area A. As the vehicle S moves into the stop area A (ST4), the action plan unit 42 computes a stop risk at the available stop position in the stop area A (ST22). At this time, as shown in the table of FIG. 5, the stop risk is evaluated as 0.6. Thereafter, the action plan unit 42 computes the stop threshold according to the cumulative travel risk (ST23), and compares the stop threshold with the stop risk (ST24). As shown in the table of FIG. 5, the stop threshold is computed as 0.5, and the stop risk is evaluated as 0.6. Therefore, the action plan unit 42 determines that the stop risk is larger than the stop threshold, The stop position determination process ends without determining the stop position.

Figure 2:
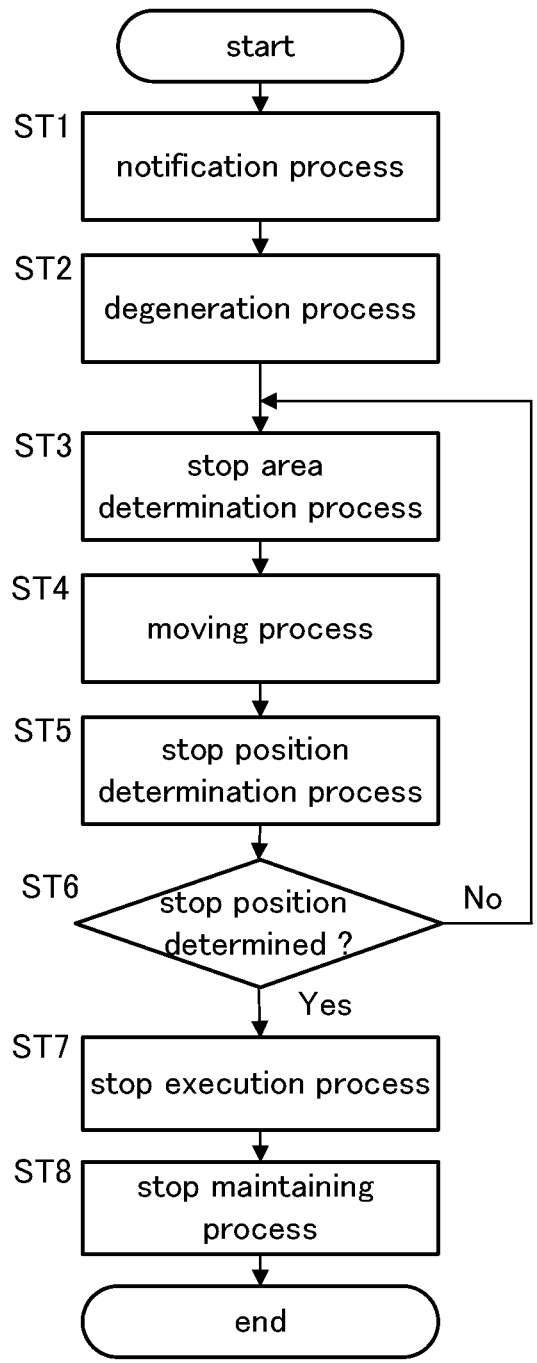
FIG. 2 is a flowchart of a stop process.

Thereafter, as shown in FIG. 2, the action plan unit 42 determines that the stop position has not been determined (ST6), and performs the stop area determination process once again (ST3). Thus, as shown in FIG. 5, the action plan unit 42 chooses the available stop area B closest to the vehicle S from the available stop areas B, C, and D as the stop area (ST11). Thereafter, the action plan unit 42 computes the distance (6 km) on the route from the start position X to the stop area B (ST12). Further, the action plan unit 42 computes the external object recognition coefficient and the fellow occupant coefficient both as 1 (ST13, ST14). Next, as shown in the table of FIG. 5, the action plan unit 42 computes the cumulative travel risk for the stop area B as 6 (ST15), and ends the stop area determination process.

Next, the action plan unit 42 executes the moving process (ST4) to cause the vehicle S to travel from the available stop area A to the available stop area B. At this time, when a preceding vehicle is detected by the external camera 19, the vehicle S follows the preceding vehicle, and traces the trajectory which the preceding vehicle has followed. Accordingly, if there is an obstacle or the like on the road, the vehicle S can appropriately avoid the obstacle so that the vehicle S can be more safely moved between the available stop areas.

When the vehicle S moves into the available stop area B, the action plan unit 42 extracts an available stop position, and computes the stop risk (ST21, ST22). As shown in FIG. 5, the available stop area B is located along a straighter road than the available stop area A. Thus, the stop risk in the available stop area B is lower than that in the available stop area A, and the stop risk is evaluated to be 0.2 as shown in the table of FIG. 5. Thereafter, the action plan unit 42 computes the stop threshold (ST23). At this time, since the cumulative travel risk is computed as 6, the stop threshold is evaluated as 0.6. Next, the action plan unit 42 compares the stop threshold with the stop risk (ST24). Since the stop threshold is 0.6 and the stop risk is 0.2, the action plan unit 42 determines the available stop position as the stop position, and ends the stop position determination process. Thereafter, the stop execution process (ST7) is executed, and the vehicle S is brought to a stop at the stop position in the available stop area B as shown in FIG. 5.

As discussed above, when the vehicle S cannot be brought to a stop in the available stop area (available stop area A), the vehicle S autonomously travels to another available stop area (available stop area B), and comes to a stop in the available stop area which has become the finally selected stop area. Thus, if there is no suitable stop position in the provisionally selected stop area, the vehicle S travels on to the next available stop area. If the next available stop area is found to provide a suitable stop position, this available stop area is selected as the final stop area, and the vehicle S is brought to a stop at the suitable stop position in the finally selected stop area. Thus, the vehicle S can be brought to a stop is a suitable location in a highly reliable manner.

The action plan unit 42 selects the stop area and the stop position by comparing the stop threshold with the stop risk. Therefore, the vehicle S can be brought to a stop at a position where the smallest possible risk is involved.

The stop threshold increases monotonically with the cumulative travel risk, and the cumulative travel risk increases monotonically with the mileage. Therefore, the stop threshold monotonously increases with the travel distance. On the other hand, the stop risk is set to a value of 0 to 1 depending on the situation of each available stop area. Since the vehicle S comes to a stop as soon as the stop risk becomes equal to or less than the stop threshold, the travel distance which vehicle travels until the vehicle comes to a stop is at most limited to the distance from the start position X to the stop area where the stop threshold is 1 or more (the D region in FIG. 5B) without regard to the conditions in the intervening available stop areas. Therefore, the vehicle S can be reliably brought to a stop without the fear of allowing the vehicle S to continue to travel over an unduly long distance.

Figure 6:
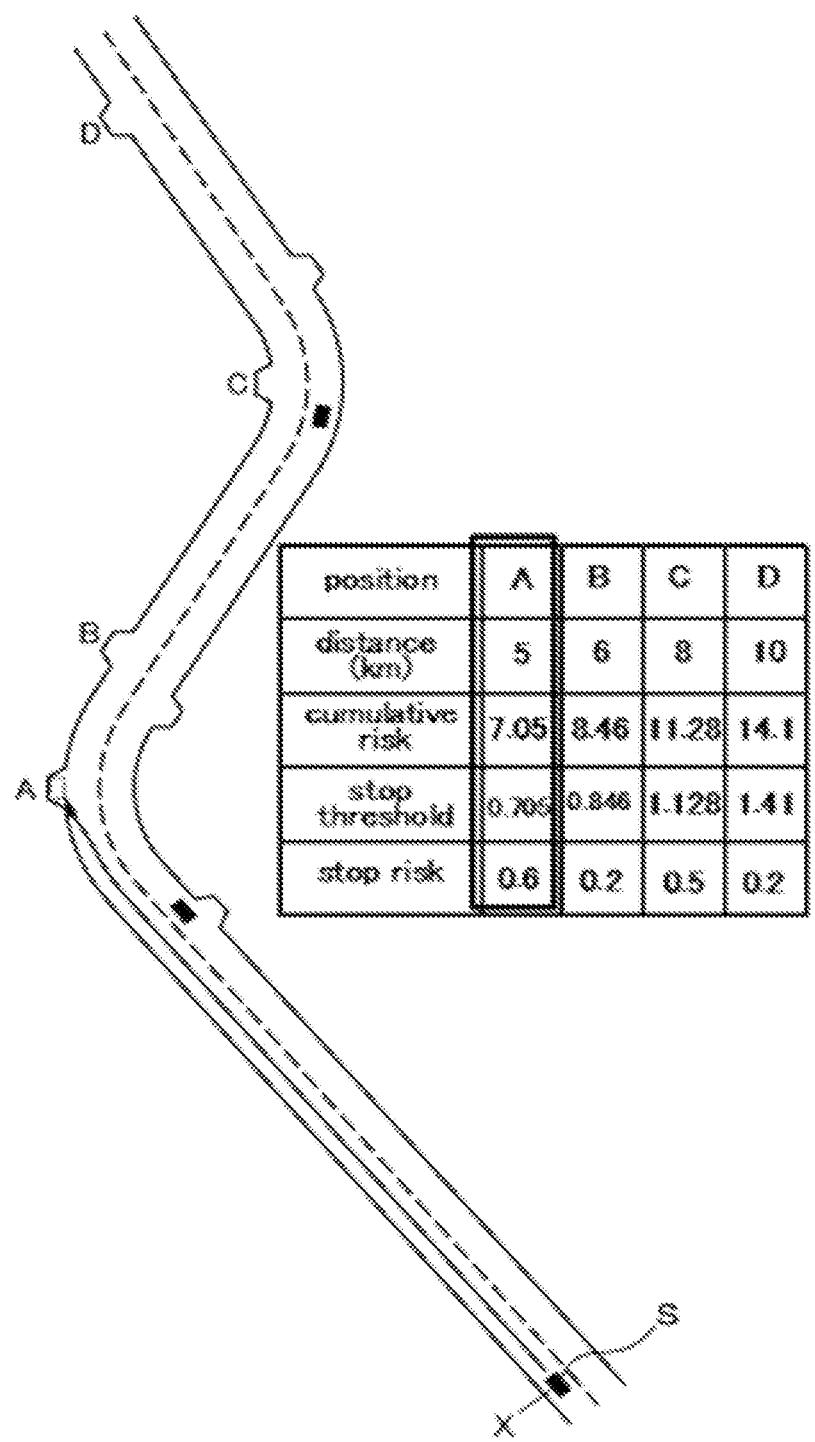
FIG. 6 is a diagram illustrating the movement of the vehicle in the stop process and the risks involved in traveling and stopping in available areas during the nighttime on a rainy day.

FIG. 6 schematically shows the movement of the vehicle S when the stop process is started at the same start position X similarly as in FIG. 5. Only the driver in onboard the vehicle S, and it is at night and rainy. FIG. 6 also includes a table showing the distance on the route, the cumulative travel risk, the stop threshold, and the stop risk for each area similarly as in the table of FIG. 5.

The action plan unit 42 executes the stop area determination process at the start position X, and provisionally selects the available stop area A as the stop area. Further, the action plan unit 42 computes the distance on the route from the start position X to the available stop area A and the associated cumulative travel risk. However, since it is nighttime and rainy, the external object recognition coefficient is 1.2×1.2=1.41 so that the cumulative travel risk is 1.41 times greater than in the case of daytime and fine weather (as was the case in the example of FIG. 5).

When the vehicle S reaches the available stop area A, the action plan unit 42 computes the stop threshold and the stop risk, and compares them. At this time, as shown in the table of FIG. 6, the stop threshold in the available stop area A is 0.705 and the stop risk is 0.6 so the action plan unit 42 determines the available stop position in the available stop area A as the finally selected stop position. As a result, the vehicle S comes to a stop at this stop position which is closer to the start position X than the stop position selected in the daytime and under fine weather.

When the brightness of the image taken by the external camera 19 is low and the road sign is difficult to detect, such as at night, when the weather is poor due to rain, snow, hail, or fog, the external object recognition coefficient is set to be larger than 1. As a result, the rate of increase in the cumulative travel risk per unit travel distance at night is greater than in daytime. In addition, the rate of increase in the cumulative travel risk per unit travel distance in rainy weather is greater than in sunny weather. As a result, the stop threshold at night or in the rain, snow, hail, or fog increases, and the vehicle S tends to be brought to a stop at a position closer to the start position X. Therefore, when it is difficult to detect the road signs, the travel distance to the stop area tends to be reduced, and the safety of the vehicle S can be enhanced. Further, since the external object recognition coefficient can be computed according to the time of the day and the weather, the external object recognition coefficient can be computed without any difficulty.

When there is a fellow occupant, the fellow occupant coefficient is set to a value larger than 1, and the increase rate of the cumulative travel risk per unit travel distance increases. As a result, the cumulative travel risk and the stop threshold increase more rapidly so that the vehicle S tends to be brought to a stop at a position closer to the start position X. Therefore, the vehicle S can be brought to a stop more quickly when there is a fellow occupant. As a result, the fellow occupant is able to take over the driving with a minimum delay.

When the distance to the following vehicle is equal to or less than the appropriate inter-vehicle distance, the action plan unit 42 computes the stop risk to be smaller when the inter-vehicle distance is larger than the appropriate inter-vehicle distance than when the inter-vehicle distance is equal to or smaller than the appropriate inter-vehicle distance. Therefore, when the inter-vehicle distance to the following vehicle is short and the danger of a collision by the following vehicle as the vehicle comes to a stop is significant, the stop risk is increased. Thus, when the risk of collision by the following vehicle is high and the stop risk is greater than the cumulative travel risk, the collision of the following vehicle can be avoided by causing the vehicle S to continue traveling.

Second Embodiment

The vehicle control system 101 according to the second embodiment differs from the vehicle control system 1 of the first embodiment only in the steps ST12 and ST15 of the stop area determination process, and the other parts are the same. The description of the other parts is omitted.

In step ST12, the action plan unit 42 computes an effective distance on the route from the start position X to each available stop area, instead of the actual distance on the route from the start position to the stop area. The effective distance is a distance that takes into account the difficulty in traveling. For example, upon determining that there is a narrowing of the road on the route, the action plan unit 42 increases the effective distance according to the distance of the narrowed part of the road and/or the extent of the narrowing of the road.

For instance, the action plan unit 42 may determine the effective distance as (the distance on the route from the start position to the available stop area)+(the distance of the narrowed part of the road)×(the factor of narrowing). The narrow road factor may be varied depending on the width of the narrowed part of the road, and may be set to a value of 0.01 or more and 0.10 or less. Alternatively, the action plan unit 42 may determine the effective distance by detecting the distance of a narrow part of the road which is no more than a certain threshold such as 4 m, and multiplying a certain factor to the length of the narrow part of the road when computing the effective distance.

In step ST15, the action plan unit 42 computes the cumulative travel risk as the product of the effective distance, the external object recognition coefficient, and the fellow occupant coefficient.

Next, the advantage of the vehicle control system 101 configured as described above are discussed in the following follows. The cumulative travel risk for each available stop area is greater when there is a narrowing of the road than when there is no narrowing of the road. Thereby, the travel distance of the vehicle S tends to be reduced where there is a narrowing of the road so that the vehicle S can be stopped more quickly.

Third Embodiment

The vehicle control system 201 according to the third embodiment differs from the vehicle control system 1 of the first embodiment only in the steps ST12 and ST15 of the stop area determination process, and the other parts are the same. The description of the other parts is omitted.

In step ST12, the action plan unit 42 computes the travel time required for the vehicle to travel from the start position to each available stop area, instead of the distance on the route from the start position to the stop area.

In step ST15, the action plan unit 42 computes the cumulative travel risk as the product of the travel time, the external object recognition coefficient, and the fellow occupant coefficient.

Next, the advantages of the vehicle control system 201 configured as described above are discussed in the following. Since the cumulative travel risk can be computed according to the time spent in the travel lane, the cumulative travel risk can be computed according to the risk associated with the traveling of the vehicle S. Further, as the travel time becomes longer, the cumulative travel risk increases. Therefore, the travel time of the vehicle S can be shortened so that the vehicle S can be stopped more quickly.

Fourth Embodiment

The vehicle control system 301 according to the fourth embodiment differs from the vehicle control system 1 of the first embodiment in the method of calculating the stop risk in step ST22 of the stop position determination process. The other parts of the vehicle control system 301 according to the fourth embodiment are the same as those of the vehicle control system 1 of the first embodiment, and a description thereof will not be repeated.

In the vehicle control system 1 according to the first embodiment, the action plan unit 42 added a predetermined value when the distance to the following vehicle is equal to or less than the appropriate inter-vehicle distance, compared to when the distance is larger than the appropriate inter-vehicle distance. On the other hand, in the vehicle control system 301 according to the fourth embodiment, the stop risk is computed to be greater when the following vehicle is detected by the vehicle sensor 7 than when the following vehicle is not detected by the vehicle sensor 7. The vehicle sensor 7 in this embodiment may include the external camera 19 for monitoring the rear of the vehicle, and the detection range of the external camera 19 for detecting following vehicles may be about 100 m. When the computation of the stop risk is completed, the action plan unit 42 executes step ST23.

The advantages of the vehicle control system 301 configured as described above are discussed in the following. If a following vehicle is detected behind the vehicle, the risk of stopping is computed to be higher. Accordingly, when a following vehicle is detected behind the vehicle, or in other words, when there is a possibility of a rear end collision by the following vehicle, the vehicle is made less likely to be brought to a stop, and the safety of the vehicle is improved. In addition, since the stop risk is computed according to the presence or absence of the following vehicle, the configuration is simpler than in the case where the stop risk is computed according to the inter-vehicle distance.

Fifth Embodiment

The vehicle control system 401 according to the fifth embodiment differs from the vehicle control system 1 of the first embodiment in the method of calculating the stop risk in step ST22 of the stop position determination process. The other parts of the vehicle control system 401 according to the fifth embodiment are the same as those of the vehicle control system 1 of the first embodiment, and thus description thereof will be omitted.

In the vehicle control system 401 according to the fifth embodiment, when the vehicle is about to reach an available stop area, the action plan unit 42 determines if the vehicle is traveling in a passing lane (or a fast lane) according to the current position of the vehicle and the map information acquired by the navigation device 9. When the vehicle is traveling in the passing lane, a predetermined value is added to the stop risk, thereby computing a greater stop risk than when not traveling in the passing lane. When the computation of the stop risk is completed, the action plan unit 42 executes step ST23.

The effect of the vehicle control system 401 configured as described above will be described. If the vehicle is traveling in the passing lane when the vehicle is about to reach the stop area, it is necessary to change lanes or the like before bringing the vehicle to a stop. In the vehicle control system 401, the risk of stopping is computed to be higher when the vehicle is traveling in the passing lane than when the vehicle is traveling in a travel lane (a slow lane), and the vehicle may continue to travel to a newly available stop area without stopping. Thus, the vehicle can be stopped more safely.

Sixth Embodiment

The vehicle control system 501 according to the sixth embodiment differs from the vehicle control system 1 of the first embodiment in the method of calculating the stop risk in step ST22 executed by the action plan unit 42. The rest of the configuration of the vehicle control system 501 according to the sixth embodiment is the same as the vehicle control system 1 of the first embodiment, and the description thereof will not be repeated.

In the vehicle control system 501 according to the sixth embodiment, the action plan unit 42 determines if each of the available stop areas is within an area where there is a restriction in the travel lane in step ST12. The area where the travel lane is restricted may be, for example, within a predetermined range from an entrance or an exit of a road ramp, or may be within a predetermined range from a point where a road construction is underway. The action plan unit 42 computes the corresponding stop risk to be larger when the stop area is located within the area where the travel lane is restricted than when the stop area is located outside of the area where the travel lane is restricted. When the computation of the stop risk is completed, the action plan unit 42 executes step ST23.

The advantages of the vehicle control system 501 configured as described above are discussed in the following. When there is an available stop area within the area where the travel lane is restricted, the stop risk is increased as compared with the case where the vehicle is outside the area where the travel lane is restricted. This allows the vehicle to come to a stop outside of the area where the vehicle may be congested owing to the restriction in the travel lane. Therefore, the traffic of the surrounding vehicles are prevented from being obstructed, and the vehicle can be brought to a stop more safely.

Seventh Embodiment

The vehicle control system 601 according to the seventh embodiment differs from the vehicle control system 1 of the first embodiment in the method of calculating the cumulative travel risk in step ST15 executed by the action plan unit 42. The other parts of the vehicle control system 601 according to the sixth embodiment are the same as those of the vehicle control system 1 of the first embodiment, and thus description thereof will be omitted.

In the vehicle control system 601 according to the seventh embodiment, the map information stored by the navigation device 9 includes the results of lane changes of the surrounding vehicles. The history of the lane changes of the surrounding vehicles means the number of times the lane changes are performed by the surrounding vehicles during a prescribed period of time in the past in each of prescribed places on the roads along the route. The number of times the lane changes have been performed may be computed in advance by, for example, a road manager according to data on the movement of the vehicles over the prescribed time period acquired by an observation camera provided on the road. Generally, the number of times the lane changes of the surrounding vehicles are performed within a predetermined period of time in merging roads, branch roads and the likes tend to be greater than in other parts of the roads.

In step ST15, the action plan unit 42 obtains the history of the lane changes of the surrounding vehicles at each point on the route from the start position of the stop process to each of the available stop areas. Thereafter, along the route from the start position of the stop process to the arrival at each available stop area, the action plan unit 42 computes the total sum of the number of lane changes of the surrounding vehicles performed within a predetermined period at each point on the route. The action plan unit 42 then computes the cumulative travel risk according to the computed total number of times of lane changes of the surrounding vehicles. In the present embodiment, as the sum of the number of lane changes of the surrounding vehicles increases, the cumulative travel risk is computed to be larger. When the computation of the cumulative travel risk is completed, the action plan unit 42 ends the stop area determination process.

The advantages of the vehicle control system 601 configured as described above are discussed in the following. If the total number of lane changes of the surrounding vehicles on the route from the start position of the stop process to the arrival at each available stop area increases, the cumulative travel risk increases. Therefore, the risk arising from the lane changes of the surrounding vehicles is taken into account in computing the cumulative travel risk, and the cumulative travel risk involved for the vehicle to travel from the start position to each available stop area can be appropriately computed. As described above, when the total number of lane changes increases, the cumulative travel risk is computed to be larger so that a route in which the lane changes of the surrounding vehicle are frequent can be avoided so that the vehicle can be brought to a stop more safely.

The present invention has been described in terms of specific embodiments, but is not limited by such embodiments, and can be modified in various ways without departing from the spirit of the present invention. The cumulative travel risk was represented by the product of various coefficients and the travel distance, but the present invention not limited to this mode. The cumulative travel risk may also be computed in a different manner so that the cumulative travel risk monotonically increases with respect to the travel distance, the travel time, the effective distance, and various coefficients.

In the above embodiments, the external object recognition coefficient was determined according to time and weather, but the present invention is not limited to this mode. For example, the external object recognition coefficient may be computed by comparing the shape of the road sign included in the road information with the shape of the road sign acquired by the external camera 19, and quantifying the degree of coincidence between the two. At this time, the external object recognition coefficient may be set to be close to 1 when the degree of coincidence is high, and to be larger than 1 when the degree of coincidence is low.

In the above embodiments, the cumulative travel risk was computed in the stop area determination process, but the present invention is not limited to this mode. For example, the cumulative travel risk may be computed in the stop position determination process. At this time, the cumulative travel risk may be computed as a risk taken by the vehicle S before reaching the stop position, or in other words, the cost that is incurred until the vehicle S reaches the stop position. At this time, the vehicle control system may either compute the final cumulative travel risk at the start of the stop process or compute the current cumulative travel risk or revise the earlier computations as the vehicle progresses toward the final stop area. In the latter case, changes in the conditions of the road, the weather and the time of the day can be accounted for in the computation of the cumulative travel risk.

In the above embodiments, the action plan unit 42 computed the cumulative travel risk as the product of the mileage, the external object recognition coefficient, and the fellow occupant coefficient, but the present invention is not limited to this mode. The action plan unit 42 may be configured to compute the cumulative travel risk strictly according to the travel distance, and the vehicle control system 1 may not include the occupant monitoring device 11.

In the above embodiments, the action plan unit 42 computed the stop risk according to the distance between the vehicle and the following vehicle, but the present invention is not limited to this mode. The action plan unit 42 may compute the stop risk according to the distance between the vehicle and any nearby vehicle or the distance between the own vehicle and a vehicle traveling along a side of the own vehicle. In particular, if the action plan unit 42 computes the stop risk according to the distance to the vehicle traveling on the left side, the risk associated with the presence of the vehicle on the left side of the own vehicle can be properly taken into account because the own vehicle will be required to change lanes to the left lane before coming to a stop at the available stop area.

The invention claimed is:
1. A vehicle control system, comprising:
  a control unit for steering, accelerating, and decelerating a vehicle;
  an occupant monitoring device configured to monitor a driver of the vehicle;
  an external environment recognition device configured to acquire information on an environment surrounding the vehicle; and
  a map device retaining map information;

wherein the control unit is configured to execute a stop process by which the vehicle is parked in a prescribed stop area when it is detected that the control unit or the driver has become incapable of properly maintaining a traveling state of the vehicle, and wherein, in the stop process, the control unit determines a plurality of available stop areas according to the information on the environment surrounding the vehicle and the map information, and computes, for each available stop area, a cumulative travel risk obtained by accumulating a travel risk involved in traveling from a position of the vehicle when the stop process is initiated to each available stop area and a stop risk in stopping in each available stop area, the control unit determining an available stop area immediately preceding the one at which the cumulative travel risk exceeds the stop risk as a final stop area by comparing the cumulative travel risk with the stop risk in each available stop area sequentially from the nearest one.

2. The vehicle control system according to claim 1, wherein when a preceding vehicle is detected by the external environment recognition device, the control unit causes the vehicle to follow the preceding vehicle in each interval between adjoining available stop areas.

3. The vehicle control system according to claim 1, wherein the control unit obtains the cumulative travel risk as increasing monotonically with a travel distance or a travel time.

4. The vehicle control system according to claim 1, wherein the external environment recognition device is configured to capture an image of road signs, and the control unit increases the cumulative travel risk as the image of road signs grows darker.

5. The vehicle control system according to claim 1, wherein the control unit increases the cumulative travel risk for each unit travel distance more at night than in daytime.

6. The vehicle control system according to claim 1, wherein the control unit increases the cumulative travel risk for each unit travel distance more on a rainy day than on a fine day.

7. The vehicle control system according to claim 1, wherein the occupant monitoring device is configured to detect an occupant other than a driver, and the control unit increases the cumulative travel risk for each unit travel distance more when the occupant other than the driver is detected than when the occupant other than the driver is not detected.

8. The vehicle control system according to claim 1, wherein the external environment recognition device is configured to detect a following vehicle, and the control unit increases the cumulative travel risk for each unit travel distance more when the following vehicle is detected as the vehicle is about to come to a stop in the next available stop area than when the following vehicle is not detected.

9. The vehicle control system according to claim 8, wherein the external environment recognition device is configured to detect an inter-vehicle distance between the vehicle and a following vehicle, and the control unit increases the cumulative travel risk for each unit travel distance more when the inter-vehicle distance between the following vehicle and the vehicle is equal to or lower than a prescribed value than when the inter-vehicle distance is greater than the prescribed value.

10. The vehicle control system according to claim 1, wherein the control unit increases the cumulative travel risk for each unit travel distance more when the vehicle is traveling in a fast lane than when the vehicle is traveling in a slow lane.

11. The vehicle control system according to claim 1, wherein the control unit increases the cumulative travel risk in a part of a road where lanes are restricted.

12. The vehicle control system according to claim 1, wherein the control unit determines the stop risk at each available stop area from the map information.

13. The vehicle control system according to claim 1, wherein the control unit increases the cumulative travel risk in a narrow part of a road.

14. The vehicle control system according to claim 1, wherein the control unit increases the cumulative travel risk in a part of a route where past data indicates a high frequency of lane changes.

15. A vehicle control system, comprising:
a control unit for steering, accelerating, and decelerating a vehicle;
an occupant monitoring device configured to monitor a driver of the vehicle;
an external environment recognition device configured to acquire information on an environment surrounding the vehicle; and
a map device retaining map information;
wherein the control unit is configured to execute a stop process by which the vehicle is parked in a prescribed stop area when it is detected that the control unit or the driver has become incapable of properly maintaining a traveling state of the vehicle, and
wherein, in the stop process, the control unit determines a plurality of available stop areas according to the information on the environment surrounding the vehicle and the map information, and computes, for each available stop area, a cumulative travel risk obtained by accumulating a travel risk involved in traveling from a position of the vehicle when the stop process is initiated to each available stop area and a stop risk in stopping in each available stop area,
the control unit determining a final stop area by comparing the cumulative travel risk with the stop risk in each available stop area sequentially from the nearest one, and
wherein the occupant monitoring device is configured to detect an occupant other than a driver, and the control unit increases the cumulative travel risk for each unit travel distance more when the occupant other than the driver is detected than when the occupant other than the driver is not detected.

16. The vehicle control system according to claim 15, wherein the control unit determines the available stop area at which the cumulative travel risk exceeds the stop risk as the final stop area.

17. A vehicle control system, comprising:
a control unit for steering, accelerating, and decelerating a vehicle;
an occupant monitoring device configured to monitor a driver of the vehicle;
an external environment recognition device configured to acquire information on an environment surrounding the vehicle; and
a map device retaining map information;
wherein the control unit is configured to execute a stop process by which the vehicle is parked in a prescribed stop area when it is detected that the control unit or the driver has become incapable of properly maintaining a traveling state of the vehicle, and wherein, in the stop process, the control unit determines a plurality of available stop areas according to the information on the environment surrounding the vehicle and the map information, and computes, for each available stop area, a cumulative travel risk obtained by accumulating a travel risk involved in traveling from a position of the vehicle when the stop process is initiated to each available stop area and a stop risk in stopping in each available stop area, the control unit determining a final stop area by comparing the cumulative travel risk with the stop risk in each available stop area sequentially from the nearest one, and wherein the external environment detection device is configured to detect a following vehicle, and the control unit increases the cumulative travel risk for each unit travel distance more when the following vehicle is detected as the own vehicle is about to come to a stop in the next available stop area than when the following vehicle is not detected.

18. The vehicle control system according to claim 17, wherein the control unit determines the available stop area at which the cumulative travel risk exceeds the stop risk as the final stop area.

\* \* \* \* \*